(12) United States Patent
Mandziy et al.

(10) Patent No.: US 12,524,112 B2
(45) Date of Patent: Jan. 13, 2026

(54) LIQUID TOLERANCE USING SIGNAL PROFILE ANALYSIS FOR AN ARRAY OF CAPACITANCE SENSORS

(71) Applicant: Cypress Semiconductor Corporation, San Jose, CA (US)

(72) Inventors: Vasyl Mandziy, Schyrets (UA); Oleksandr Karpin, Lviv (UA); Priyadeep Kaur, Dublin (IE); Amitava Banerjee, Cork (IE)

(73) Assignee: Cypress Semiconductor Corporation, San Jose, CA (US)

( * ) Notice: Subject to any disclaimer, the term of this patent is extended or adjusted under 35 U.S.C. 154(b) by 169 days.

(21) Appl. No.: 18/476,923

(22) Filed: Sep. 28, 2023

(65) Prior Publication Data

US 2025/0117097 A1    Apr. 10, 2025

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05); *G06F 2203/04107* (2013.01); *G06F 2203/04111* (2013.01)

(58) Field of Classification Search
CPC .... G06F 3/0418; G06F 3/04186; G06F 3/044; G06F 3/0446; G06F 2203/04107; G06F 2203/04111
See application file for complete search history.

(56) References Cited

U.S. PATENT DOCUMENTS

| | | | | |
|---|---|---|---|---|
| 2008/0222066 A1* | 9/2008 | Matias | ................ | G06F 16/2462 706/19 |
| 2008/0224912 A1* | 9/2008 | Wang | ................. | H03M 1/0658 345/173 |
| 2014/0225874 A1* | 8/2014 | Snedeker | ................ | G06F 3/041 345/178 |
| 2015/0242051 A1* | 8/2015 | Ng | ......................... | G06F 3/0418 345/174 |
| 2015/0242052 A1* | 8/2015 | Gao | ....................... | G06F 3/0446 345/178 |
| 2016/0195985 A1* | 7/2016 | Shinya | .................. | G06F 3/0418 345/173 |
| 2018/0246612 A1* | 8/2018 | Lynn | ...................... | G06F 3/0436 |
| 2020/0363891 A1* | 11/2020 | Yancey | ............. | G01R 27/2605 |

\* cited by examiner

*Primary Examiner* — Liliana Cerullo

(57) ABSTRACT

Techniques are provided for implementing liquid tolerance for a touch device. A sensor array of the touch device is scanned to generate response signals. In response to a response signal exceeding a touch threshold, a signal profile analysis is performed. The signal profile analysis includes sorting the response signals according to ascending order of delta positions to generate sorted signals. An extended vector of the sorted signals is formed. The extended vector of the sorted signals is analyzed using a fitted curve. In response to a feature of the fitted curve satisfying a criteria, the response signal is reported as a touch event. In response to the feature not satisfying the criteria, the response signal is rejected as a false touch.

19 Claims, 11 Drawing Sheets

LIQUID TOLERANCE USING SIGNAL PROFILE ANALYSIS FOR AN ARRAY OF CAPACITANCE SENSORS

TECHNICAL FIELD

The present disclosure relates to the field of providing liquid tolerance for a sensor array of capacitive sensors.

BACKGROUND

Many devices include input elements through which users can interface with the devices. These devices may include a device with a human-machine interface, a kiosk, an indoor or outdoor electronic device, a smart device such as a smart speaker, a portable device, a wearable device, etc. For example, a smart speaker may include input elements, such as a volume slider, a power button, a wireless communication configuration button, a touchpad, and/or other types of input elements. An input element may include a capacitive sensor used to detect human touches and/or hover gestures to facilitate operation of an associated device.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a method for implementing liquid tolerance for a touch device is provided. The method includes scanning a sensor array of the touch device to generate response signals. The method includes in response to a response signal of the response signals exceeding a touch threshold, performing a signal profile analysis. The signal profile analysis includes sorting the response signals according to ascending order of delta positions to generate sorted signals. The signal profile analysis includes forming an extended vector of the sorted signals. The signal profile analysis includes analyzing the extended vector of the sorted signals using a fitted curve. The signal profile analysis includes in response to a feature of the fitted curve satisfying a criteria, reporting the response signal as a touch event. The signal profile analysis includes in response to the feature not satisfying the criteria, rejecting the response signal as a false touch.

In an embodiment of the techniques presented herein, an apparatus for implementing liquid tolerance for a touch device is provided. The apparatus includes a means for scanning a sensor array of the touch device to generate response signals. The apparatus includes a means for in response to a response signal of the response signals exceeding a touch threshold, performing a signal profile analysis. The apparatus includes a means for sorting the response signals according to ascending order of delta positions to generate sorted signals. The apparatus includes a means for forming an extended vector of the sorted signals. The apparatus includes a means for analyzing the extended vector of the sorted signals using a fitted curve. The apparatus includes a means for in response to a feature of the fitted curve satisfying a criteria, reporting the response signal as a touch event. The apparatus includes a means for in response to the feature not satisfying the criteria, rejecting the response signal as a false touch.

In an embodiment of the techniques presented herein, an apparatus is provided. The apparatus includes a sensor array of capacitive sensors connected to a sensing device that scans the sensor array to generate response signals. The apparatus includes the sensing device configured to perform a signal profile analysis in response to a response signal of the response signals exceeding a touch threshold. The sensing device performs the signal profile analysis by sorting the response signals according to ascending order of delta positions to generate sorted signals. The sensing device forms an extended vector of the sorted signals. The sensing device analyzes the extended vector of the sorted signals using a fitted curve. The sensing device identifies an amplitude of the fitted curve. In response to the amplitude satisfying an amplitude threshold, the sensing device reports the response signal as a touch event. In response to the amplitude not satisfying the amplitude threshold, the sensing device rejects the response signal as a false touch.

In an embodiment of the techniques presented herein, an apparatus is provided. The apparatus includes a sensor array of capacitive sensors connected to a sensing device, wherein the sensor array includes a touchpad and a guard sensor. The apparatus includes the sensing device configured to scan the sensor array to determine whether a false touch has occurred. The sensing device scans a sensor of the touchpad as a first scan result while the sensor is in a mutual-cap mode, wherein the touchpad is electrically coupled together as a first pin type during the scanning of the sensor. The sensing device scans the guard sensor of the sensor array as a second scan result while the guard sensor is in a self-cap mode, wherein the guard sensor is scanned as a second pin type different than the first pin type. The sensing device compares the first scan result and the second scan result to a threshold to determine whether the false touch or a touch event occurred To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
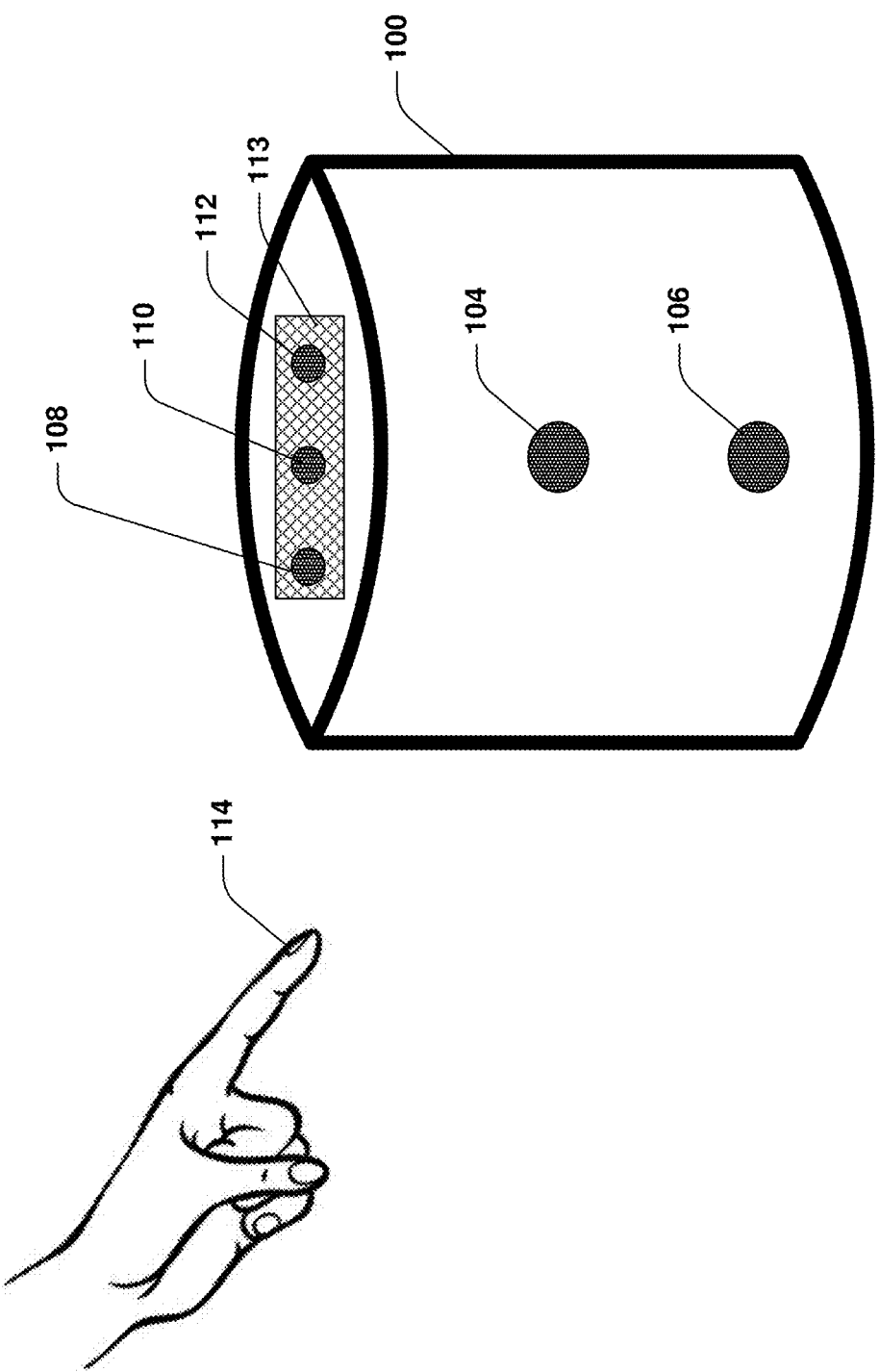
FIG. 1A is a component block diagram illustrating a device for which liquid tolerance is implemented in accordance with at least some of the techniques presented herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Systems and methods are provided for implementing liquid tolerance for devices such as smart watches, fitness bracelets, smart belts, industrial human-machine interfaces, augmented reality glasses, headphones, and/or a wide variety of other types of devices. Many types of devices (e.g., kiosks, smart devices such as a smart speaker, portable electronic devices, laptops, and/or other devices) include user input interfaces such as human-machine interfaces. A human-machine interface may include input elements used to detect user input (e.g., a user pressing or hovering over a volume up button of a smart speaker). The input elements may comprise capacitive sensors of a sensor array. A capacitive sensor is configured to detect the presence of a capacitive object (e.g., a human finger) as an interaction event (a touch event) based upon a measured capacitance of the capacitive sensor. One type of capacitance sensor is a mutual capacitance sensor that is sensed using a mutual capacitance (mutual-cap) sensing technique where changes in capacitance between two electrodes is measured. Another type of capacitance sensor is a self-capacitance sensor where a capacitance of a capacitive object is added to a capacitance of the self-capacitive sensor (a baseline/parasitic capacitance), which is measured (e.g., using a self-cap sensing technique) as an analog signal that is converted to a digital value representing a total capacitance detected by the self-capacitive sensor.

In an example, if the total capacitance detected by a capacitive sensor of the volume up button exceeds a threshold of a certain capacitance value, then a determination is made that the capacitive object interacted with the volume up button, such as where a finger of a user pressed the volume up button. Accordingly, functionality of the volume up button may be invoked such as to turn up the volume of the smart speaker. If the total capacitance detected by the capacitive sensor of the volume up button does not exceed the threshold, then a determination is made that no capacitive object has interacted with the volume up button and the functionality is not invoked. The threshold may take into account a baseline self-capacitance (e.g., a parasitic capacitance) of the capacitive sensor.

Capacitive touch sensing is used as part of human-machine interfaces for devices such as smart devices, which could be portable and used indoors and/or outdoors. These smart devices have demanding human-machine interface requirements, such as low latency and robustness where input elements (e.g., buttons, sliders, a touchpad/touch panel, etc.) function correctly without computationally expensive post processing that would contribute to increased latency of the device, and thus a reduced user experience. In order for a capacitive sensor of an input element to function correctly, the capacitive sensor should not inadvertently/erroneous detect input (a false touch) when a user is not interacting with the input element. This inadvertent/unintentional touch detection can be caused by many factors, such as rain, a coffee spill, a cell phone placed over a button, keys placed nearby the button, other liquids, and/or other capacitive objects coming in contact with or in close proximity to the capacitive sensor, which could trigger the capacitive sensor to detect an input event when a user is not interacting with the input element.

Many conventional sensor layouts are configured to improve the sensitivity of capacitive sensors in order to ignore liquid or other causes of unintentional touch detection. For example, multiple self-capacitive sensors may be combined in order to form additional self-capacitive sensors that are used to detect the presence of liquid or other unintentional touches. Another technique may utilize a guard sensor and/or shield signal that helps cancel small capacitances added from small amounts of liquid, but does not work well for larger capacitances such as a large liquid spill on the sensor array. Many of these conventional techniques may use a large number of sensors that are scanned as part of mitigating the effect of liquids. Using numerous sensors increases power consumption, cost, and time to perform the scan. For example, if there are 20 self-capacitance sensors that are combined, then all 20 self-capacitance sensors are scanned, which requires a significant amount of time and power consumption, and the cost of the 20 sensors. Even with the conventional techniques, a capacitive sensor can still erroneously detect unintentional touches due to rain, liquids (e.g., liquid droplets, pouring liquid, dipping/submersion in liquid, etc.), tap water, salty water, and/or other capacitive objects. This results in erroneous operation of a device such as where the smart speaker increases or decreases volume based upon rain or a liquid spill coming in contact with a volume button.

In order to improve the operation of devices that utilize capacitive sensors for detecting user interaction/input with input elements, the techniques provided herein are capable of stopping a device from performing unwanted operations in response to unintentional touches such as from liquid. In particular, a device includes a sensor array of capacitive sensors, such as a touchpad/touch panel. One or more of the capacitive sensors may correspond to various functions of the device (e.g., a capacitive sensor of an input element such as a power button corresponding to a power function of the device for turning the device on and off). A sensing device is used to determine whether a response signal is a touch event or a false touch due to rain, liquid, tap water, salty water, or other capacitive objects that could cause the capacitive sensor to detect a false touch (an unintentional touch) that is not a user interacting with the input element.

During runtime operation of the device (e.g., while the smart speaker is playing music), the sensing device may scan the sensor array (e.g., a touch panel of the smart speaker) to generate response signals. In some embodiments of providing liquid tolerance, a determination is made as to whether a response signal exceeds a touch threshold. In response to a response signal exceeding the touch threshold (e.g., a finger touch capacitive threshold is exceeded), a signal profile analysis is performed. The signal profile analysis includes the sorting of the response signals according to ascending order of delta positions (e.g., sorting of capacitive sensors according to positions of the capacitive sensors in relation to capacitive values of the response signal) to generate sorted signals. For example, a vector of delta positions is calculated as an absolute difference between a touch position and a position of a center of each sensor, and the signals are further sorted based upon the vector. An extended vector of the sorted signals is formed. For example, sorted signals may be mirrored from the right of a sensor signal of a sensor having a highest capacitive value ($Sig_0$) to the left. The extended vector of the sorted signals is analyzed using a fitted curve such as by a Gaussian curve. Features of the fitted curve (e.g., an amplitude, a maximum amplitude, a width, a correlation coefficient, etc.) are evaluated against various criteria (e.g., thresholds) to determine whether the response signal is a touch event or a false touch.

In some embodiments of providing liquid tolerance, the sensor array includes a touchpad (touch panel) and a guard sensor. Various different scans of the touchpad and/or the guard sensor are performed for touch detection, touch position calculation, liquid pour detection on the touchpad, dipping detection of the touchpad being dipped in a liquid, salty water pouring detection, etc. The scans may include scanning the touchpad in a self-cap mode while inactive sensors are connected to a shield, scanning the guard sensor in self-cap mode while the while inactive sensors are connected to the shield, scanning a sensor in a mutual-cap mode where the touchpad is ganged as a receiver pin (Rx) and the guard sensor is used as a transmitter pin (Tx). In this way, the results of the scans are used to determine whether a touch event or a false touch has been detected.

FIG. 1A is a component block diagram illustrating a device 100 for which liquid tolerance is provided. The device 100 (e.g., a portable speaker) may comprise various input elements (e.g., a touchpad) that correspond to functionality of the device 100. In some embodiments, the device 100 comprises a power input element 104 corresponding to a power function used to turn the device on and off (e.g., a power input element of the touchpad). The device 100 comprises a wireless connectivity element 106 corresponding to a wireless pairing function used to connect the device 100 to another device over a wireless communication connection (e.g., a wireless connectivity input element of the touchpad). The device 100 may comprise other input elements, such as a volume up element 108, a volume down element 110, a channel element 112, and/or other input elements used to control various functions of the device 100.

The input elements may include capacitive sensors of a sensor array 113 used to detect user interaction with the input elements based upon measured capacitances of the capacitive sensors when the capacitive sensors are being sensed/measured. In some embodiments, the sensor array may comprise a touchpad (touch panel), a guard sensor, a shield, and/or other elements. In some embodiments, a user may use a finger 114 to press the volume up element 108 in order to increase a volume of the device 100. Accordingly, when the finger 114 presses the volume up element 108, a capacitance of the finger 114 is added to a baseline capacitance (e.g., a parasitic capacitance) of a capacitive sensor of the volume up element 108. When the capacitive sensor of the volume up element 108 is sensed/measured, a capacitance of the volume up element 108 is measured. The measured capacitance may be measured as an analog signal that is converted to a digital value. The measured capacitance (the digital value) is compared to a threshold capacitance. If the measured capacitance exceeds the threshold capacitance, then an interaction event (a touch event) is detected and the volume of the device 100 is increased. In some embodiments, the capacitive sensors are mutual capacitance sensors or cross point sensors. Accordingly, changes in capacitance between two electrodes of a mutual capacitance sensor or cross point sensor of the volume up element 108 is measured and compared to the threshold capacitance.

The capacitive sensors may be susceptible to detecting false touches (unintentional touches) as touch events (interaction events), which would be treated the same as user interaction with the input elements of the device 100. This leads to unwanted/erroneous operation of the device 100 such as where an unintentional touch is detected as user input that modifies operation of the device 100 (even though the unintentional touch is not a user interacting with the device 100, but could be from liquid or other capacitive object touching the device 100).

Figure 1B:
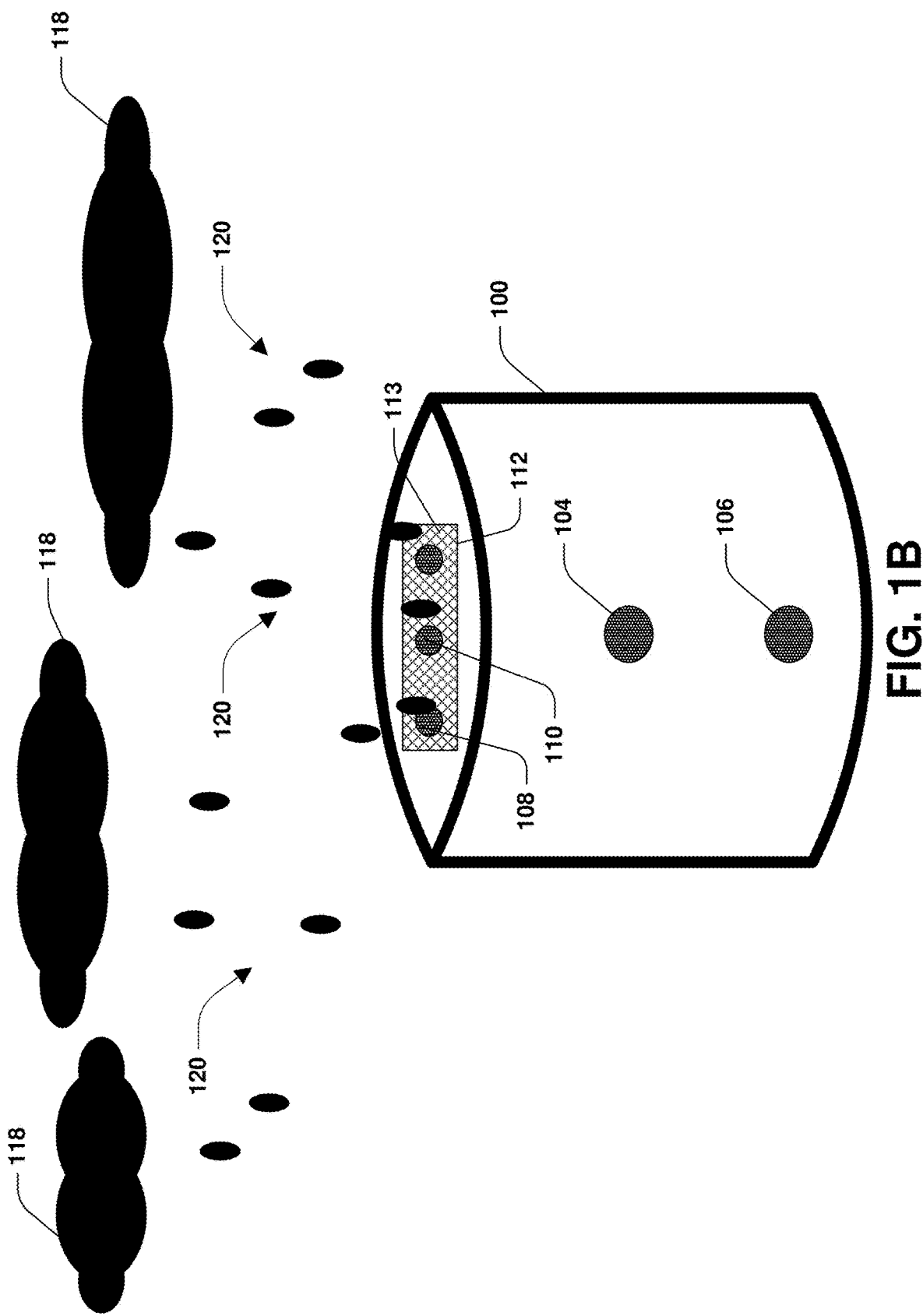
FIG. 1B is a component block diagram illustrating a device for which liquid tolerance is implemented in accordance with at least some of the techniques presented herein.

FIG. 1B illustrates an embodiment of detecting a false touch for the device 100. The device 100 may be located outside where there is rain 120 from clouds 118. Some of the rain 120 may land on the device 100, such as on the volume up element 108. Without the techniques described herein for unintentional touch detection, the rain 120 on the volume up element 108 may cause the capacitive sensor of the volume up element 108 to have a capacitance exceeding the threshold capacitance. This causes the device 100 to increase the volume of the device 100 even though a user has not interacted with the volume up element 108. In order to stop the device 100 from performing unwanted operations in response to unintentional touches from the rain 120, a sensing device is configured to perform a signal profile analysis and/or various scans to detect false touches (unintentional touches), such as to distinguish the rain 120 touching the sensor array 113 from a finger touch, which are described in further detail in relation to FIGS. 2-6B.

Figure 2:
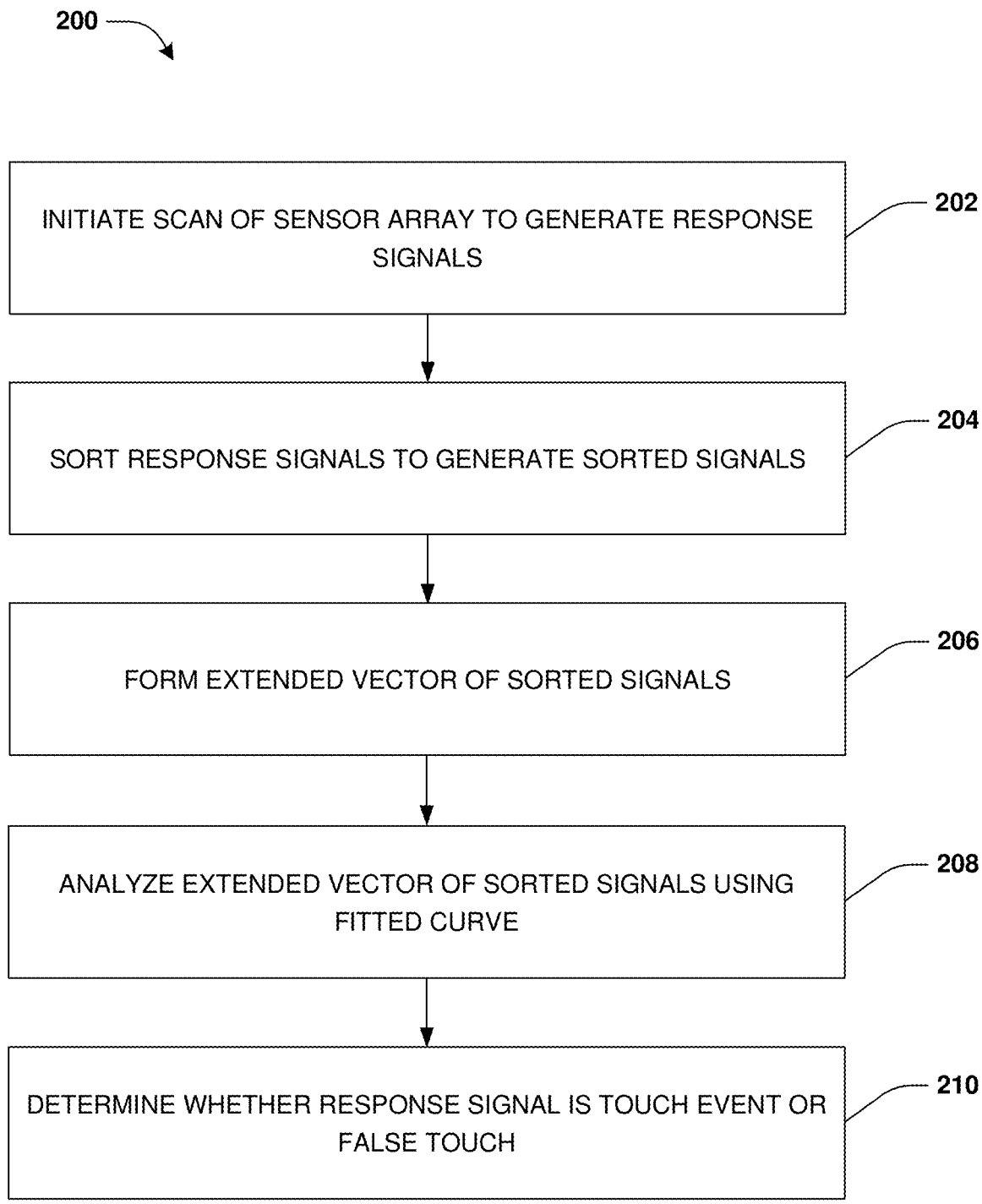
FIG. 2 is an illustration of an example method for providing liquid tolerance utilizing a signal profile analysis in accordance with at least some of the techniques presented herein.
Figure 3A:
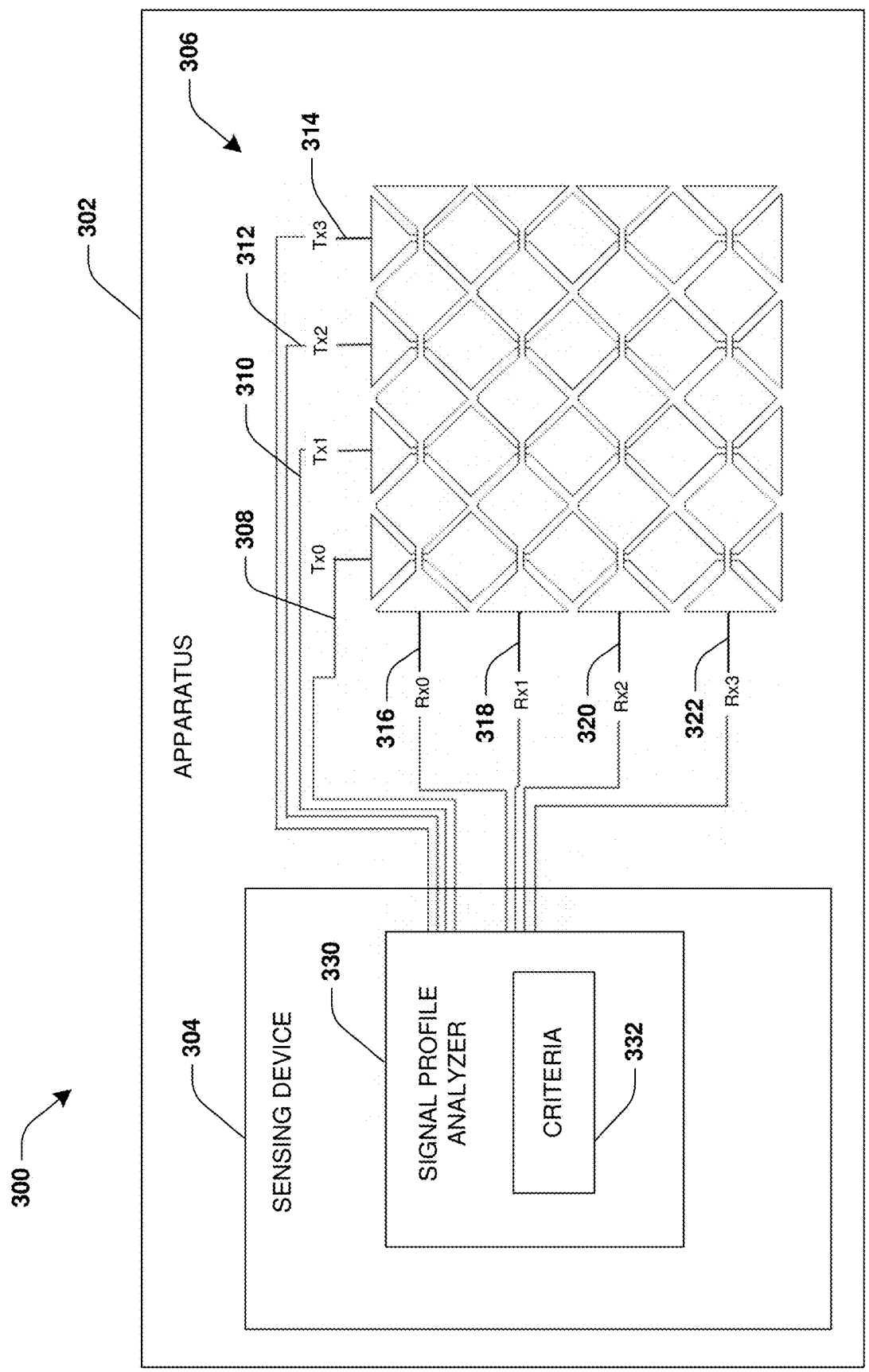
FIG. 3A is a component block diagram illustrating an apparatus for providing liquid tolerance utilizing a signal profile analysis in accordance with at least some of the techniques presented herein.

FIG. 2 is an illustration of an example method 200 for providing liquid tolerance utilizing a signal profile analysis, which is further described in conjunction with system 300 of FIG. 3A. An apparatus 302 such as a touch device comprises a sensor array 306 of capacitive sensors that are connected to a sensing device 304. The capacitive sensors of the sensor array 306 may be connected to the sensing device 304 through transmitter pins (e.g., transmitter pin (Tx0) 308, transmitter pin (Tx1) 310, transmitter pin (Tx2) 312, transmitter pin (Tx3) 314) and receiver pins (e.g., receiver pin (Rx0) 316, receiver pin (Rx1) 318, receiver pin (Rx2) 320, receiver pin (Rx3) 322). The sensor array 306 may include other elements some as a guard sensor, a shield, a touchpad formed by the capacitive sensors, etc.

The sensing device 304 includes a signal profile analyzer 330 that utilizes various criteria 332 (e.g., thresholds) for distinguishing between touch events and false touches. During operation 202 of method 200, the sensing device 304 initiates a scan of the sensor array 306 to generate response signals. The scan is performed by utilizing the transmitter pins and receiver pins. In some embodiments, the scan is performed while the sensor array 306 is in a self-cap mode. The sensing device 304 may evaluate the response signals using a touch threshold (e.g., a capacitive value threshold) to determine whether a potential touch event has occurred (e.g., a user pressing the touchpad).

In response to a response signal exceeding the touch threshold, the signal profile analyzer 330 performs a signal profile analysis utilizing the criteria 332. During operation 204 of method 200, the signal profile analyzer 330 sorts the response signals according to an ascending order of delta positions (e.g., sorting of capacitive sensors according to positions of the capacitive sensors in relation to capacitive values of the response signal) to generate sorted signals. For example, a vector of delta positions is calculated as an absolute difference between a touch position and a position of a center of each sensor, and the signals are further sorted based upon the vector.

During operation 206 of method 200, the signal profile analyzer 330 forms an extended vector of the sorted signals. For example, sorted signals may be mirrored from the right of a sensor signal of a sensor having a highest capacitive value ($Sig_0$) to the left. During operation 208 of method 200, the signal profile analyzer 330 analyzes the extended vector of the sorted signals using a fitted curve. For example, a Gaussian function is used to calculate a Gaussian curve in real-time during operation of the apparatus 302 in order to create the fitted curve.

During operation 210 of method 200, the signal profile analyzer 330 determines whether a touch event (e.g., a user touching the touchpad) or a false touch (e.g., liquid coming in contact with the touchpad) occurred utilizing the criteria 332 and features of the fitted curve. In some embodiments, the criteria 332 may include a threshold and the feature is an amplitude of the fitted curve. The amplitude may be identified based upon a difference between a maximum signal measurement and an average signal measurement. The amplitude is compared to the threshold to determine whether the amplitude exceeds the threshold, which is used to determine whether the touch event or the false touch occurred. In some embodiments, the criteria 332 may include an amplitude threshold and the feature is a maximum amplitude of the fitted curve. The maximum amplitude is compared to the amplitude threshold to determine whether the maximum amplitude exceeds the amplitude threshold, which is used to determine whether the touch event or the false touch occurred.

In some embodiments, the criteria 332 may include a width threshold and the feature is a width (a response width) of the fitted curve. The width is compared to the width threshold to determine whether the width exceeds the width threshold, which is used to determine whether the touch event or the false touch occurred. In some embodiments, the feature corresponds to a correlation coefficient. An actual touch event should have a small response width and/or a large amplitude of the extend signal's profile, and thus the correlation coefficient is calculated between the extended signal's profile (e.g., the extended vector) and the fitted curve. The correlation coefficient may be utilized to determine whether the criteria 332 has been satisfied. In this way, the amplitude, maximum amplitude, width (response width), correlation coefficient, and/or other features may be used to determine whether the criteria 332 is satisfied (a touch event occurred) or not satisfied (a false touch). If the touch event is detected, then the touch event may be reported to a processor of the apparatus 302 or other component. If the false touch is detected, then the false touch is ignored and not reported to the processor or other component.

In some embodiments, the signal profile analyzer 330 implements the signal profile analysis to reject false touches from liquid pouring on the sensor array 306. A guard electrode (e.g., a guard sensor) of the sensor array 306 may be used to reject false touches from liquid droplets touching the sensor array 306. In this way, various techniques may be used to identify and reject false touches for different scenarios.

Figure 3B:
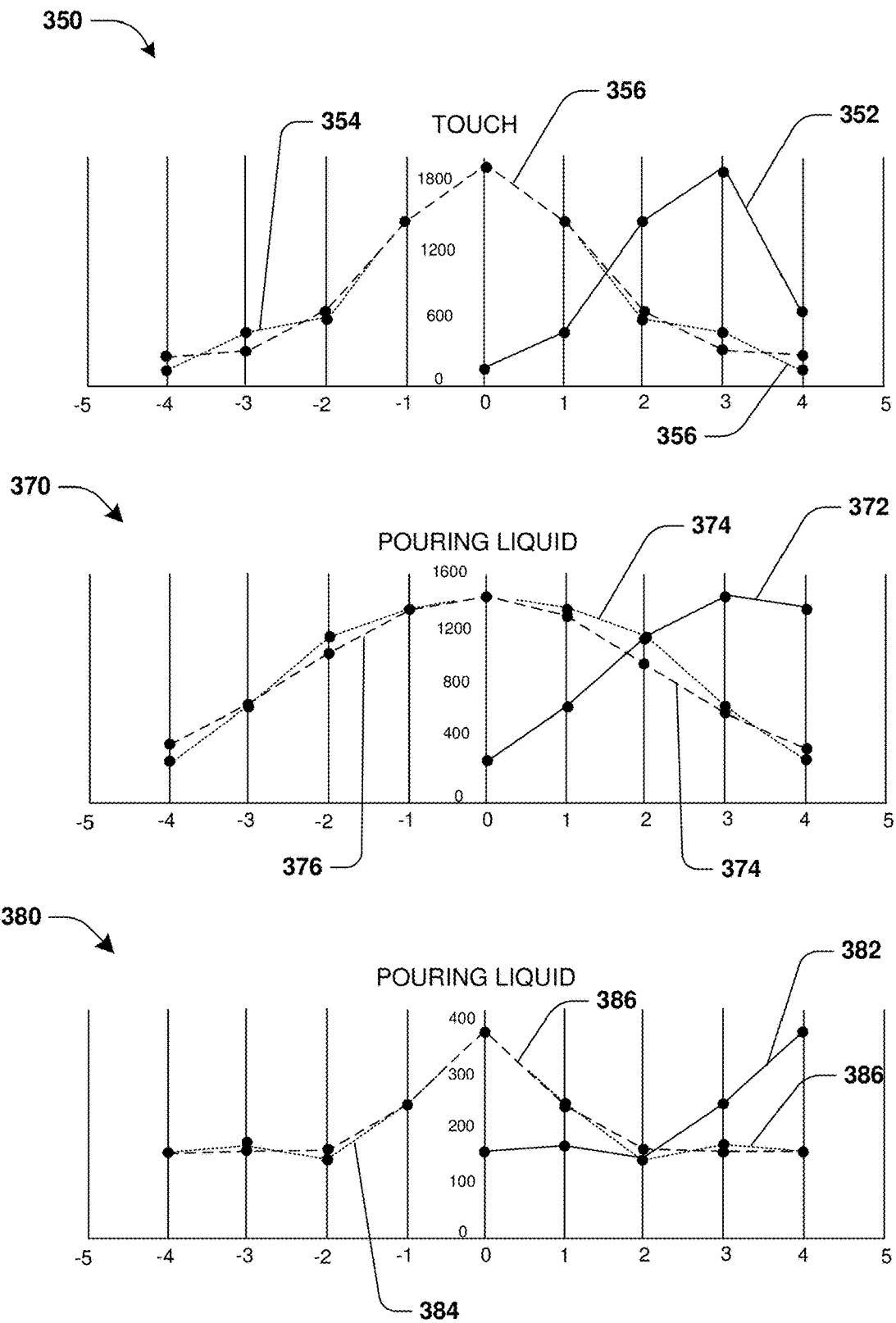
FIG. 3B is an illustration of an example of charts relating to providing liquid tolerance utilizing a signal profile analysis in accordance with at least some of the techniques presented herein.

FIG. 3B is an illustration of an example of charts relating to providing liquid tolerance utilizing a signal profile analysis. A first chart 350 has an x-axis representing a sensor index of sensors of a sensor array. The first chart 350 has a y-axis representing signal counts representative of capacitance value measured by the sensors of the sensor array. A line 352 represents a plot of response signal values measured from the sensors of the sensor array (e.g., a measurement of response signals from 5 sensors: sensor 0, 1, 2, 3, and 4). A line 354 represents a plot of an extended vector formed from the response signal values being sorted. In particular, the maximum value of the response signals (measured by sensor 3) is plotted at 0 of the sensor index along the x axis. The next largest value of the response signals (measured by sensor 2) is plotted at −1 and 1 of the sensor index along the x axis. The next largest value of the response signals (measured by sensor 4) is plotted at −2 and 2 of the sensor index along the x axis. The next largest value of the response signals (measured by sensor 1) is plotted at −3 and 3 of the sensor index along the x axis. The smallest value of the response signals (measured by sensor 0) is plotted at −4 and 4 of the sensor index along the x axis. A line 356 represents a plot of a fitted curve (e.g., a Gaussian curve) derived from the extended vector represented by line 354. The lines of the first chart 350 are illustrative of a scenario where an actual touch has occurred. For example, features of the fitted curve, such as an amplitude of 1934, a scaled response width of 304, and a correlation coefficient of 239, may satisfy criteria indicative of an actual touch event.

The second chart 370 represents a scenario where a liquid is pouring on the sensor array such that a false detection is detected. A line 372 represents a plot of response signal values measured from the sensors of the sensor array (e.g., a measurement of response signals from 5 sensors: sensor 0, 1, 2, 3, and 4). A line 374 represents a plot of an extended vector formed from the response signal values being sorted. In particular, the maximum value of the response signals (measured by sensor 3) is plotted at 0 of the sensor index along the x axis. The next largest value of the response signals (measured by sensor 4) is plotted at −1 and 1 of the sensor index along the x axis. The next largest value of the response signals (measured by sensor 2) is plotted at −2 and 2 of the sensor index along the x axis. The next largest value of the response signals (measured by sensor 1) is plotted at −3 and 3 of the sensor index along the x axis. The smallest value of the response signals (measured by sensor 0) is plotted at −4 and 4 of the sensor index along the x axis. A line 376 represents a plot of a fitted curve (e.g., a Gaussian curve) derived from the extended vector represented by line 374. Features of the fitted curve, such as an amplitude of 1455, a scaled response width of 553, and a correlation coefficient of 241, may not satisfy criteria indicative of an actual touch event (e.g., the scaled response width of 553 is too large to be an actual touch), and thus a false touch is detected.

A third chart 380 represents a scenario where a liquid is pouring on the sensor array such that a false detection is detected. A line 382 represents a plot of response signal values measured from the sensors of the sensor array (e.g., a measurement of response signals from 5 sensors: sensor 0, 1, 2, 3, and 4). A line 384 represents a plot of an extended vector formed from the response signal values being sorted. In particular, the maximum value of the response signals (measured by sensor 4) is plotted at 0 of the sensor index along the x axis. The next largest value of the response signals (measured by sensor 3) is plotted at −1 and 1 of the sensor index along the x axis. The next largest value of the response signals (measured by sensor 2) is plotted at −2 and 2 of the sensor index along the x axis. The next largest value of the response signals (measured by sensor 1) is plotted at −3 and 3 of the sensor index along the x axis. The smallest value of the response signals (measured by sensor 0) is plotted at −4 and 4 of the sensor index along the x axis. A line 386 represents a plot of a fitted curve (e.g., a Gaussian curve) derived from the extended vector represented by line 384. Features of the fitted curve, such as an amplitude of 372, a scaled response width of 184, and a correlation coefficient of 251, may not satisfy criteria indicative of an actual touch event (e.g., the amplitude is too small), and thus a false touch is detected.

Figure 4:
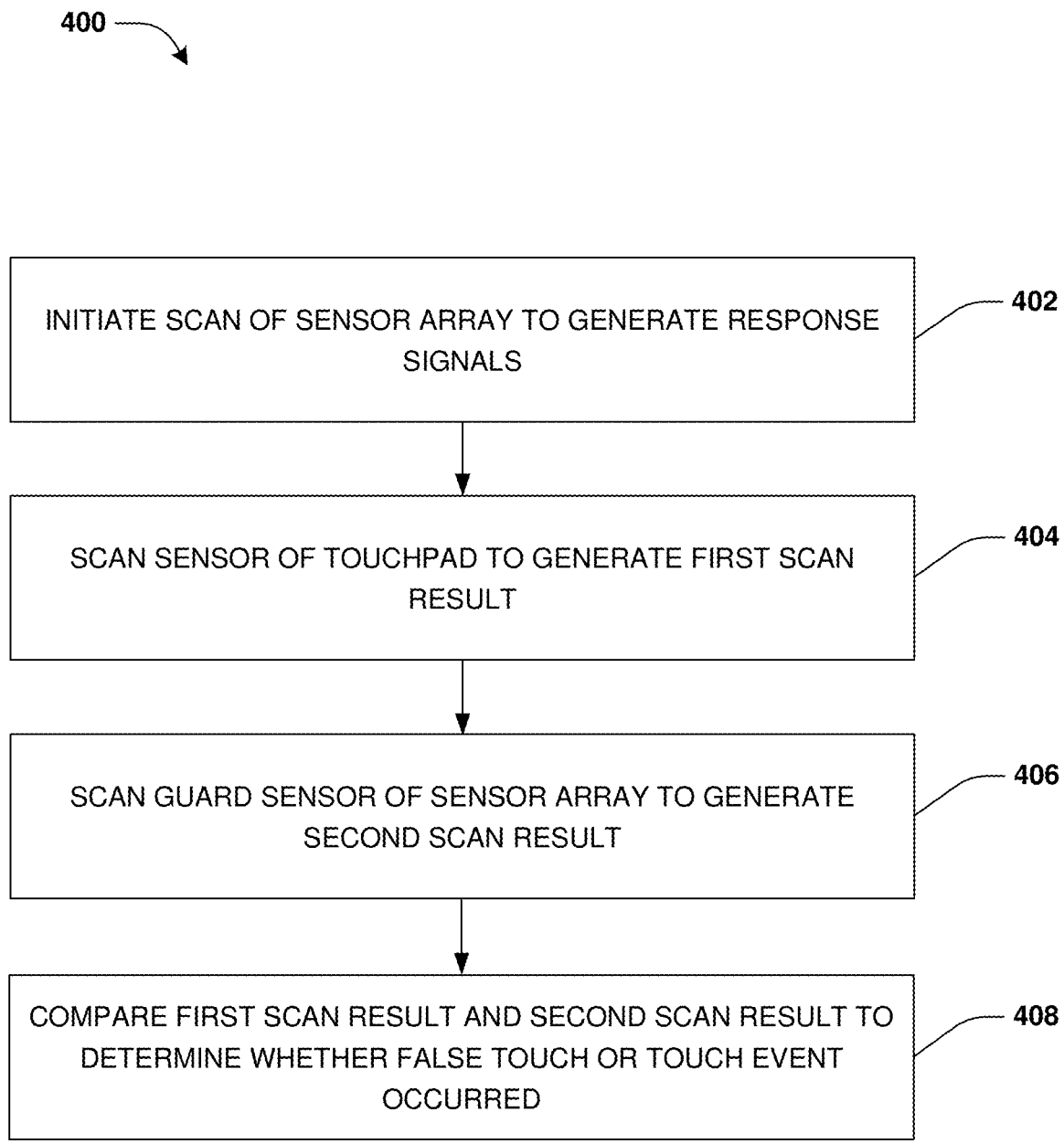
FIG. 4 is an illustration of an example method for providing liquid tolerance utilizing scan results from one or more scan operations in accordance with at least some of the techniques presented herein.
Figure 5:
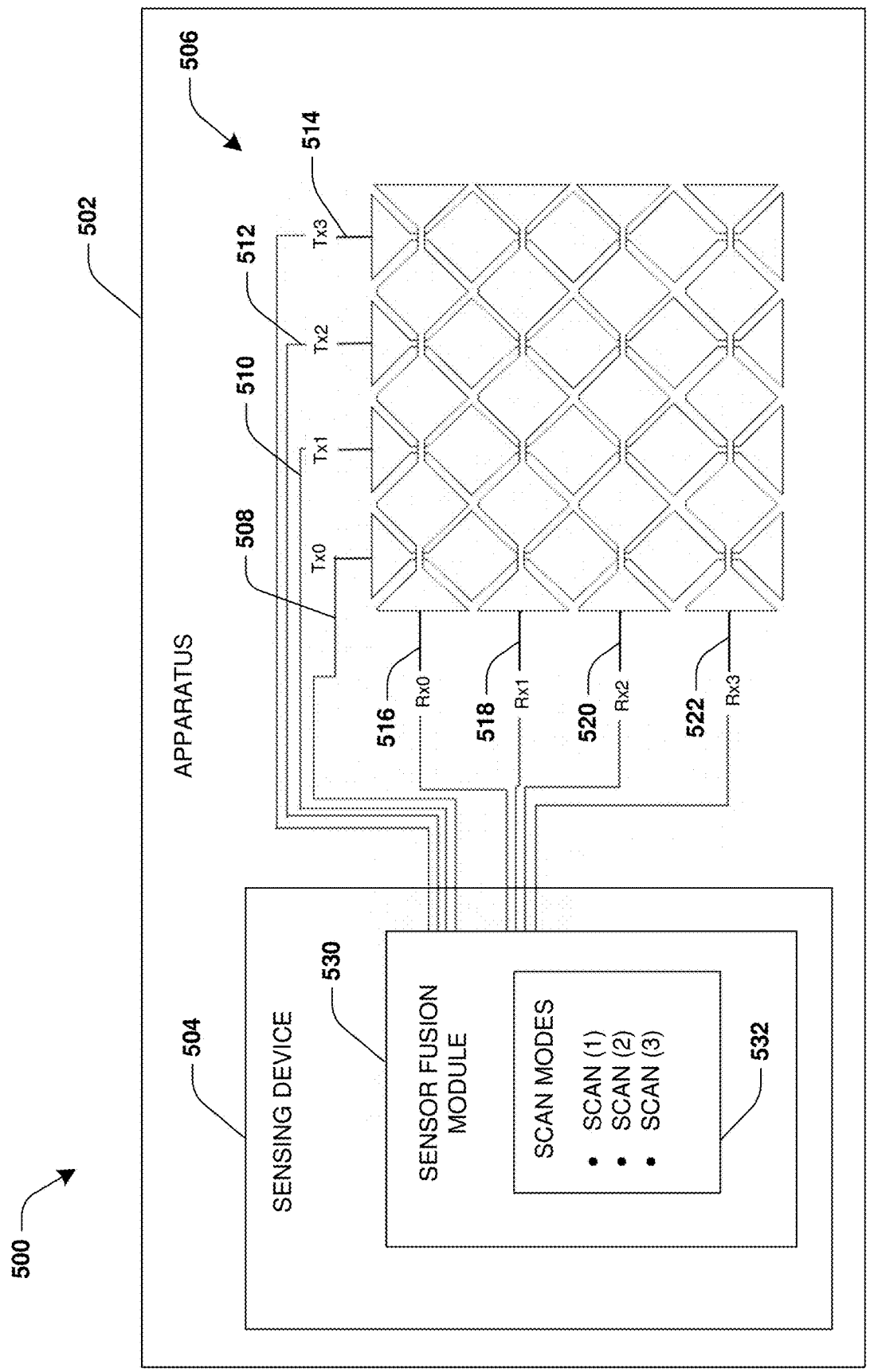
FIG. 5 is a component block diagram illustrating an apparatus for providing liquid tolerance utilizing scan results from one or more scan operations in accordance with at least some of the techniques presented herein.

FIG. 4 is an illustration of an example method 400 for providing liquid tolerance utilizing scan results from one or more scan operations, which is described in relation to system 500 of FIG. 5. An apparatus 502 such as a touch device comprises a sensor array 506 of capacitive sensors that are connected to a sensing device 504. The capacitive sensors of the sensor array 506 may be connected to the sensing device 504 through transmitter pins (e.g., transmitter pin (Tx0) 508, transmitter pin (Tx1) 510, transmitter pin (Tx2) 512, transmitter pin (Tx3) 514) and receiver pins (e.g., receiver pin (Rx0) 516, receiver pin (Rx1) 518, receiver pin (Rx2) 520, receiver pin (Rx3) 522). The sensor array 506 may include other elements some as a guard sensor, a shield, a touchpad formed by the capacitive sensors, etc.

The sensing device 504 includes a sensor fusion module 530 configured to implement various scan modes 532 to scan the sensor array 506 in order to determine whether a touch event or a false touch are detected. During operation 402 of method 400, the sensing device 504 initiates one or more scans of the sensor array 506. During operation 404 of method 400, the sensing device 504 performs a first scan of the scan modes 532 to scan a sensor of the touchpad of the sensor array 506 as a first scan result generated by the sensor fusion module 530. The first scan may be performed while the sensor is in a mutual-cap mode. The touchpad may be electrically coupled together as a first pin type (e.g., as a transmitter pin or a receiver pin) during the scanning of the sensor. During operation 406 of method 400, the sensing device 504 performs a second scan of the scan modes 532 to scan the guard sensor of the sensor array 506 as a second scan result generated by the sensor fusion module 530. The second scan may be performed while the guard sensor is in a self-cap mode. The guard sensor is scanned as a second pin type different than the first pin type.

During operation 408 of method 400, the sensor fusion module 530 compares the first scan result and the second scan result to a threshold (e.g., a ratio_guard_mutual_self_threshold) to determine whether the false touch or a touch event occurred. In some embodiments, a ratio of the first scan result to the second scan result may be compared to the threshold by the sensor fusion module 530. In this way, sensor fusion from scanning the sensor in the mutual-cap mode and the guard sensor in the self-cap mode (while the touchpad is ganged/connected as Rx or Tx and the guard sensor is Tx or Rx) can be used to identify and reject false touches such as from salty liquid being poured on the sensor array 506.

In some embodiments, the sensor fusion module 530 utilizes various different scan modes 532 for touch detection, touch position calculation, liquid pouring detection (e.g., tap water pouring on the sensor array), liquid dipping detection (e.g., the sensor array being dipped in water), salty water pouring detection, etc. In some embodiments, the touchpad is scanned to generate a scan result. The touchpad is scanned while the touchpad is in a self-cap mode and/or when inactive sensors (sensors not being scanned) are connected to the shield. The scan result is utilized for liquid pouring detection such as to determine whether water is pouring on the touchpad. In some embodiments, the guard sensor is scanned to generate a scan result. The guard sensor is scanned while the guard sensor is in a self-cap mode and/or when inactive sensors (sensors not being scanned) are connected to the shield. The scan result may be used for liquid pour detection for the touchpad and/or for liquid drip detection for the touchpad.

Figure 6A:
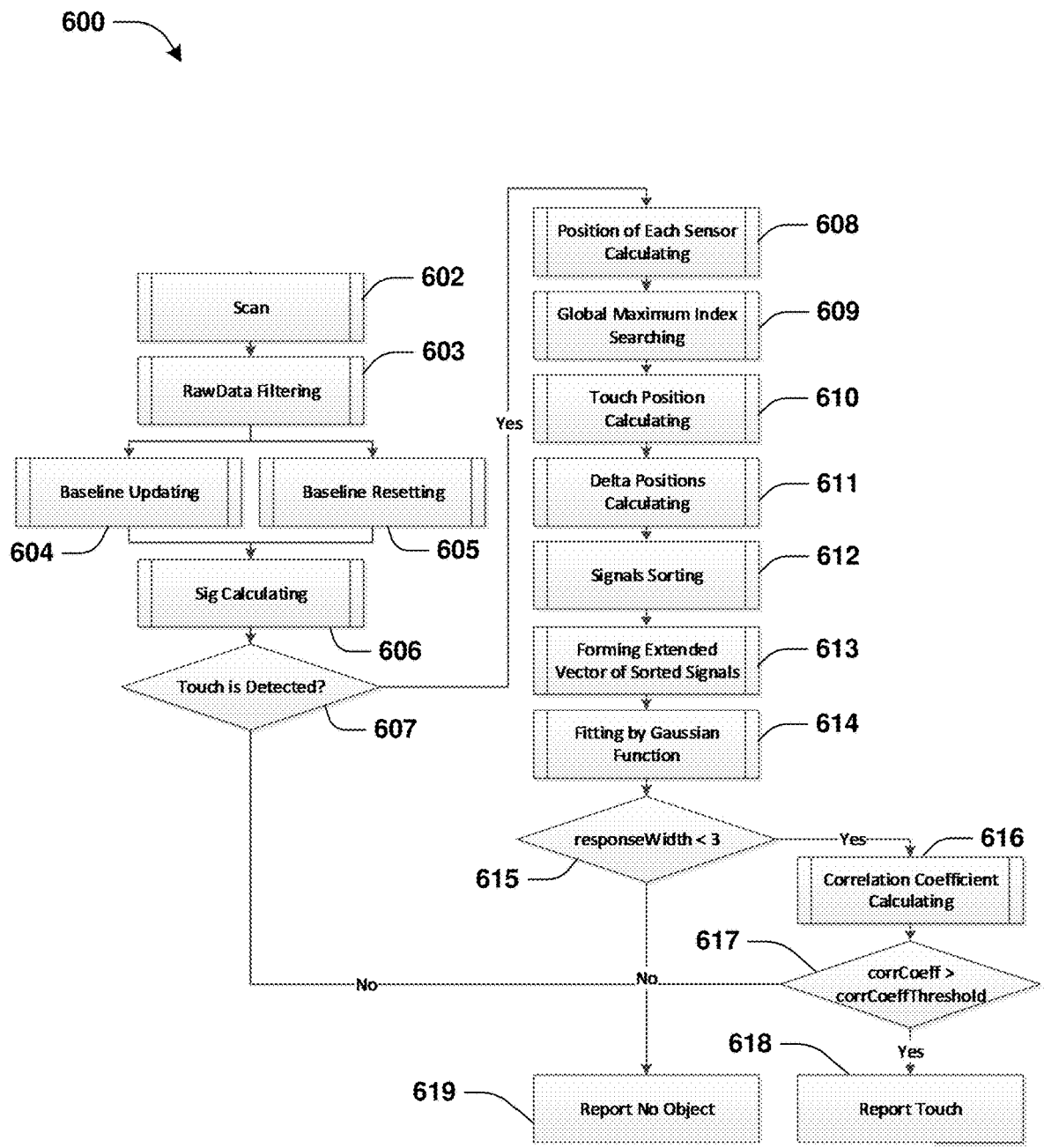
FIG. 6A is an illustration of an example method for providing liquid tolerance utilizing a signal profile analysis in accordance with at least some of the techniques presented herein.

FIG. 6A is an illustration of an example method 600 for providing liquid tolerance utilizing a signal profile analysis. At 602, a sensor array such as a touch panel is scanned while in a self-cap mode. At 603, raw data filtering is performed upon the scanned data. At 604 and 605, baseline updating and/or resetting is performed to determine a baseline capacitance (e.g., a parasitic capacitance of the touch panel). At 606, response signals for each sensor of the sensor array are calculated ($Sig_0$, $Sig_1$, $Sig_2$, etc.), which may take into account the filtered raw data and the baseline capacitance of each sensor: $Sig_i$=RawDataFilt$_i$−Baseline; where: RawDataFilt$_i$ is filtered by the IIR filter scanned data; Baseline$_i$ is the baseline value after applying a baseline update/reset algorithm; and i is the sensor index. At 607, a determination is made as to whether a touch is detected. If no touch is detected, then no object is reported at 619 and the method 600 ends.

If a touch is detected, then a position of each sensor of the sensor array is calculated at 608. The positions of the sensors are used for sorting response signals for subsequently calculating a best-fitted Gaussian curve. The position of each sensor (center position) is calculated as:

$$centerPos_{idxSns} = \frac{resolution}{numSensors} \cdot \left(idxSns + \frac{1}{2}\right)$$

where: resolution is resolution in X or Y direction; numSensors is a number of columns or number of rows; idxSns=[0, . . . (numSensors−1)] is the sensor index. This can be simplified as:

$$centerPos_{idxSns} = \frac{resolution \cdot (2 \cdot idxSns + 1) + numSensors}{2 \cdot numSensors}.$$

At 609, a global maximum index search is performed. The index of the global maximum is identified separately for an X direction and a Y direction for use in a subsequent touch position calculation. The global maximum is calculated as an index of the sensor with the largest response signal: idxMax=[0, . . . (numSensors−1)].

At 610, a touch position calculation is performed to identify a position of a possible touch, which is used to subsequently sort the response signals. The X and Y positions are calculated using the 3-sensors centroid algorithm without virtual sensors:

$$\text{position} = \frac{\text{resolution}}{\text{numSensors}} \cdot \left( idx\text{Max} + \frac{1}{2} + \frac{Sig_{idxMax+1} - Sig_{idxMax-1}}{Sig_{idxMax-1} + Sig_{idxMax} + Sig_{idxMax+1}} \right),$$

which can be simplified as:

$$\text{position} = \frac{\text{resolution} \cdot [(2 \cdot idx\text{Max} + 1) \cdot (Sig_{idxMax-1} + Sig_{idxMax} + Sig_{idxMax+1}) + + 2 \cdot (Sig_{idxMax+1} - Sig_{idxMax-1})] + +}{2 \cdot \text{numSensors} \cdot (Sig_{idxMax-1} + Sig_{idxMax} + Sig_{idxMax+1})}.$$

At 611, delta positions are calculated as a vector of delta positions. The vector of delta positions is calculated as an absolute difference between the touch position and position of the center of each sensor: absDeltaPos$_{idxSns}$=|centerPos$_{idxSns}$−position| where: idxSns=[0, . . . (numSensors−1)] is the sensor index. The response signals will be further sorted based on the vector of delta positions.

At 612, the response signals are sorted in ascending order of delta positions, and an extended vector of the sorted signals will be fitted by a Gaussian curve to reject false touches resulting from liquid touching the touch panel. The response signals are sorted by: for idx=1 to (numSensors−1): for idx1=0 to (numSensors−1−idx): if (absDeltaPos$_{idxSns1}$>absDeltaPos$_{idxSns1+1}$):tmp=Sig$_{idx1}$; Sig$_{idx1}$=Sig$_{idx1+1}$; Sig$_{idx1+1}$=tmp; tmp=absDeltaPos$_{idx1}$; absDeltaPos$_{idx1}$=absDeltaPos$_{idx1+1}$; absDeltaPos$_{idx1+1}$=tmp.

At 613, an extended vector of the sorted signals is formed by mirroring all sorted signals from the right of Sig$_0$ to the left. As a result, the extended vector, which consists of (2·numSensors−1) signals, will be formed (sortedSigExt$_{idx}$). The extended vector will be fitted by the Gaussian curve.

At 614, the extended vector is fitted using a Gaussian function:

$$S_i = A \cdot e^{-\frac{(i-\mu)^2}{2\sigma^2}} + d$$

where: A is the maximum height (amplitude); μ is the curve center (mean); σ is a standard deviation that controls the width of the curve; d is the shift of the curve. In some embodiments, an algorithm for estimating Gaussian function parameters to fit the data points of the extended vector includes:

$$\Delta = \int_{-\infty}^{+\infty} (S_i - d) di = \int_{-\infty}^{+\infty} A \cdot e^{-\frac{(i-\mu)^2}{2\sigma^2}} di.$$

A Euler-Poisson integral:

$$\int_{-\infty}^{+\infty} e^{-t^2} dt = \sqrt{\pi} \quad \text{Denote: } t = \frac{i - \mu}{\sqrt{2}\sigma} \Rightarrow i = \sqrt{2} \cdot \sigma \cdot t + \mu.$$

This yields $$\Delta = \int_{-\infty}^{+\infty} A \cdot e^{-t^2} d(\sqrt{2} \cdot \sigma \cdot t + \mu) = A \cdot \sigma \cdot \sqrt{2\pi}.$$

On the other side, the area under the Gaussian curve is a sum of response signals in the extended vector. In some embodiments, a sum of only signals in the range [μ−2σ; λ+2σ] around the curve centre u is considered because [μ−3σ; μ+3σ] represents the 99.7%, [μ−2σ; μ+2σ] represents the 95% and [μ−σ; μ+σ] represents the 68% of the area under the Gaussian function.

The d value can be calculated as the average value of all response signals in the extended vector outside the range [idxMax−responseWidth, idxMax+responseWidth]:

$$d = \frac{\sum_{i=0}^{idxMax-responseWidth-1} sortedSigExt_i + \sum_{i=idxMax+responseWidth+1}^{numSensorsExt-1} sortedSigExt_i}{numSensorsExt - 2 \cdot responseWidth - 1}$$

where: responseWidth is the width of the Gaussian curve to detect the signals profile resulting from a touch. The initial value is 1, and it is recalculated iteratively for the NUM_ITER_GAUSSIAN=4 iterations. idxMax is the index of the global maximum in the extended vector of response signals. The sum of all signals in the extended vector inside the range [idxMax−responseWidth, idxMax+responseWidth]: $\Delta = \sum_{idxMax-responseWidth}^{idxMax+responseWidth}$(sortedSigExt$_i$−d). The equation for the amplitude calculation: A=sortedSigExt$_{idxMax}$−d. The Standard deviation is calculated as $$\sigma = \frac{\sum_{i=idxMax-responseWidth}^{idxMax+responseWidth} (sortedSigExt_i - d)}{A \cdot \sqrt{2\pi}}.$$

response width is calculated as $$responseWidth = \sigma = \frac{2 \cdot \sum_{i=idxMax-responseWidth}^{idxMax+responseWidth} (sortedSigExt_i - d)}{A \cdot \sqrt{2\pi}}.$$

This can be simplified as:

$$responseWidth \approx \frac{2 \cdot \sum_{i=idxMax-responseWidth}^{idxMax+responseWidth} (sortedSigExt_i - d) + \frac{5 \cdot A}{2}}{5 \cdot A}.$$

Also, a scaled version of the curve's width is calculated as:

$$responseWidthScaled = \frac{512 \cdot \sum_{i=idxMax-responseWidth}^{idxMax+responseWidth}(sortedSigExt_i - d) + \frac{5 \cdot A}{2}}{5 \cdot A}.$$

In this way, a width (responseWidthScaled) of the fitted curve and/or amplitude of the fitted curve can be used to determine whether a touch event or a false touch as occurred, at 615. An actual touch (touch event) should have a small response width and/or a large amplitude of the extended signal profile.

Also, a correlation coefficient, calculated at 616, can be used to determine whether a touch event or a false touch as occurred. The correlation coefficient is calculated between the extended signal profile and the best-fitted Gaussian curve if:

---
if (responseWidthScaled ≤ RESPONSE_WIDTH1) then
calculate correlation coefficient
else
if (responseWidthScaled ≤ RESPONSE_WIDTH2): then $$amplitude = sortedSigExt_{numSensors-1} - \frac{\sum_{i=0}^{numSensorsExtended-1} sortedSigExt_i}{numSensorsExtended}$$

if (AXIS_X)
amplitudeThreshold = amplitudeThresholdX
else
amplitudeThreshold = amplitudeThresholdY
end
if (amplitude ≥ amplitudeThreshold)
calculate correlation coefficient.

---

In some embodiments, RESPONSE_WIDTH1=256; RESPONSE_WIDTH2=512; amplitudeThresholdX is the signal amplitude in the X direction, which may have a default value such as 450; amplitudeThresholdY is the signal amplitude in the Y direction, which may have a default value such as 385. The amplitudeThresholdX and amplitudeThresholdY may be tuned based upon histograms built from data for 7-mm finger, a real finger, pouring water on the touch panel, etc.

Firmware may be used for calculating the correlation coefficient by:

$$\int_{-\infty}^{+\infty} i \cdot (S_i - d)di = \int_{-\infty}^{+\infty} A \cdot i \cdot e^{-\frac{(i-\mu)^2}{2\sigma^2}} di$$

$$\begin{cases} \int_{-\infty}^{+\infty} A \cdot (\sqrt{2}\cdot\sigma\cdot t + \mu)\cdot e^{-t^2} d(\sqrt{2}\cdot\sigma\cdot t + \mu) == \\ A\cdot\sqrt{2}\cdot\sigma\cdot\left[\sqrt{2}\cdot\sigma\cdot\int_{-\infty}^{+\infty} t\cdot e^{-t^2}dt + \mu\cdot\int_{-\infty}^{+\infty} e^{-t^2}dt\right] \end{cases}$$

The left integral is:

$$\int_{-\infty}^{+\infty} t\cdot e^{-t^2}dt = -\frac{1}{2}\cdot\int_{-\infty}^{+\infty} e^{-t^2}d(-t^2) = -\frac{1}{2}\cdot e^{-t^2}\Big|_{-\infty}^{+\infty} = 0$$

The right integral is a Euler-Poisson integral so the equation becomes:

$$\int_{-\infty}^{+\infty} i\cdot(S_i - d)di = A\cdot\sqrt{2\pi}\cdot\sigma\cdot\mu$$

which is divided by $$\int_{-\infty}^{+\infty}(S_i - d)di = A\cdot\sigma\cdot\sqrt{2\pi}$$

to yield:

$$\mu = \frac{\int_{-\infty}^{+\infty} i\cdot(S_i - d)di}{\int_{-\infty}^{+\infty}(S_i - d)di}.$$

Accordingly, the firmware of an apparatus can calculate the correlation coefficient as:

$$\mu = \frac{256\cdot\sum_{i=idxMax-responseWidth}^{idxMax+responseWidth} i\cdot(sortedSigExt_i - d)}{\sum_{i=idxMax-responseWidth}^{idxMax+responseWidth}(sortedSigExt_i - d)}$$

Also, the coordinate of the vertex of the best-fitted Gaussian function should be in the one-pitch distance from the global maximum:

---
idxMax = (numSensors − 1) for the extended vector of signals profile.
deltaμ = μ − 256 · (numSensors − 1)
if ((deltaμ < −256) or (deltaμ > 256))
μ = 256 · (numSensors − 1).

---

Next, the Pearson correlation coefficient between the extended signals profile and the best-fitted Gaussian function can be calculated:

$$corrCoeff = \frac{\sum_{i=0}^{numSensorsExtended-1}(sortedSigExt_i - \overline{sortedSigExt})\cdot(S_i - \overline{S})}{\sqrt{\sum_{i=0}^{numSensorsExtended-1}(sortedSigExt_i - \overline{sortedSigExt})^2 \cdot \sum_{i=0}^{numSensorsExt-1}(S_i - \overline{S})^2}}$$

The equation for the averaged extended signal calculation:

$$\overline{sortedSigExt} = \frac{\sum_{i=0}^{numSensorsExtended-1} sortedSigExt_i}{numSensorsExtended}$$

The correlation coefficient doesn't depend on the amplitude of the Gaussian function. So $A=e^5$.
This results in equation:

$$\overline{S} = \frac{e^5 \frac{\sum_{i=idxMax-responseWidth}^{idxMax+responseWidth}(sortedSigExt_i - d)}{A \cdot \sqrt{2\pi}} \cdot \sqrt{2\pi}}{numSensorsExtended}$$

This can be implied as:

$$\overline{S} = \frac{e^5 \cdot \sum_{i=idxMax-responseWidth}^{idxMax+responseWidth}(sortedSigExt_i - d)}{A \cdot numSensorsExtended}$$

$$\downarrow$$

$$\overline{S} = \frac{297 \cdot \sum_{i=idxMax-responseWidth}^{idxMaxr+responseWidth}(sortedSigExt_i - d) + A \cdot numSensorsExtended}{2 \cdot A \cdot numSensorsExtended}$$

$$S_i - d = e^5 \cdot e^{-\frac{(i-\frac{\mu}{256})^2}{2\sigma^2}} = e^x$$

where: $x = 5 - \frac{(i - \frac{\mu}{256})^2}{2 \cdot \sigma^2}$

These equations are used to formulate equation:

$$32 \cdot x = 32 \cdot 5 - \frac{32 \cdot (256 \cdot i - \mu)^2 \cdot (sortedSigExt_{idxMax} - d)^2 \cdot 2\pi}{2 \cdot 256^2 \cdot \left[\sum_{i=idxMax-responseWidth}^{idxMax+responseWidth}(sortedSigExt_i - d)\right]^2} \quad (37)$$

After simplifying:

$$32 \cdot x = 160 - \frac{(256 \cdot i - \mu)^2 \cdot (sortedSigExt_{idxMax} - d)^2}{652 \cdot \left[\sum_{i=idxMax-responseWidth}^{idxMax+responseWidth}(sortedSigExt_i - d)\right]^2}$$

Processing time can be decreased by calculating the squared correlation coefficient (multiplied by 256):

$$corrCoeff =$$

$$256 \cdot \frac{\left(\sum_{i=0}^{numSensorsExtended-1}(sortedSigExt_i - \overline{sortedSigExt}) \cdot (S_i - \overline{S})\right)^2}{\sum_{i=0}^{numSensorsExtended-1}(sortedSigExt_i - \overline{sortedSigExt})^2 \cdot \sum_{i=0}^{numSensorsExt-1}(S_i - \overline{S})^2}$$

Touch is detected only if:

$$corrCoeff > corrCoeffThreshold$$

where:

```
if (is touch in previous scan)
    corrCoeffThreshold = corrCoeff Lo
else
    corrCoeffThreshold = corrCoeff Hi.
``` corrCoeffLo is the squared correlation coefficient threshold (multiplied by 256) between the extended signals profile and best-fitted Gaussian curve. The squared correlation coefficient threshold is used when a touch is already detected. Decreasing the value improves the touch detection, but can cause a false touch. In some embodiments, the default value may be 175, and the maximum value may be 255. corrCoeffHi is the squared correlation coefficient threshold (multiplied by 256) between the extended signals profile and best-fitted Gaussian curve, which is used for touch-down events. Decreasing the value improves the touch detection, but can cause a false touch. In some embodiments, default value may be 210, the maximum value may be 255.

Figure 6B:
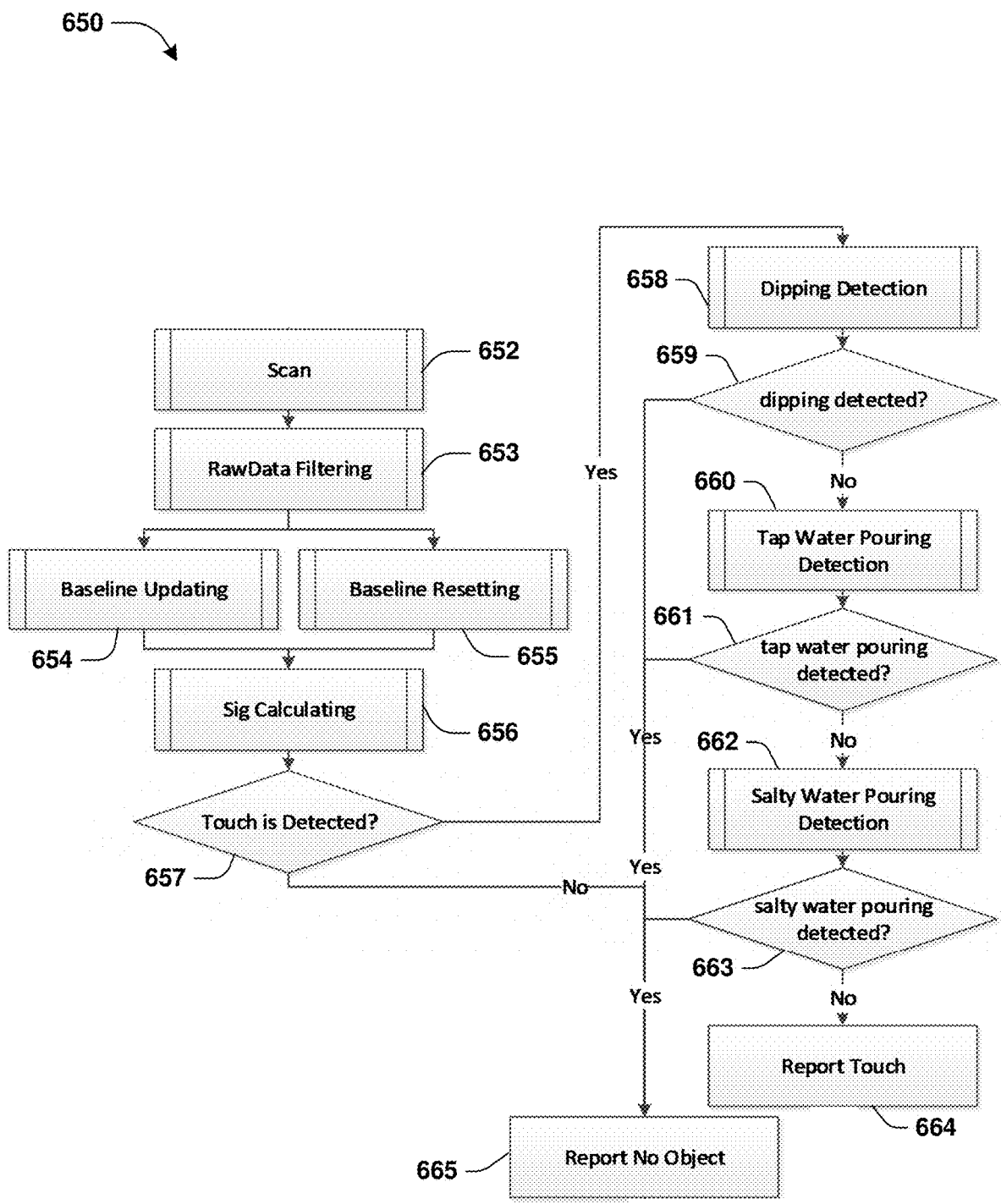
FIG. 6B is an illustration of an example method for providing liquid tolerance utilizing scan results from one or more scan operations in accordance with at least some of the techniques presented herein.

FIG. 6B is an illustration of an example method 650 for providing liquid tolerance utilizing scan results from one or more scan operations. At 652, a touchpad and guard sensor are scanned in a self-cap mode, and then are scanned in a mutual-cap mode (e.g., the guard sensor as Tx and the touchpad ganged together as Rx). At 653, raw data filtering is performed upon the data scanned from the touchpad. At 654 and 655, baseline updating and/or resetting is performed to determine a baseline capacitance (e.g., a parasitic capacitance of the touch panel). At 656, response signals for each sensor of the sensor array are calculated ($Sig_0$, $Sig_1$, $Sig_2$, etc.), which may take into account the filtered raw data and the baseline capacitance of each sensor: $Sig_i = RawDataFilt_i - Baseline$; where: $RawDataFilt_i$ is filtered by the IIR filter scanned data; $Baseline_i$ is the baseline value after applying a baseline update/reset algorithm; and i is the sensor index. At 657, a determination is made as to whether a touch is detected. A touch is detected if $max_i(Sig_i)$ exceeds some tunable parameter FingerThreshold.

Also, data scanned from the guard sensor scanned in the self-cap mode is processed with filtering, baseline updating/resetting and response signals by calculating: SigGuard=RawDataFiltGuard−BaselineGuard. The is done for mutual-cap mode by: SigGuardMut=RawDataFiltGuardMut−BaselineGuardMut.

If no touch is detected, then no object is reported at 665 and the method 650 ends.

If a touch is detected, then dipping detection is performed at 658. The condition (criteria) to reject false touches caused by dipping the panel into liquid is: if (sigGuard≥sigGuardThreshold) then reject touch where: sigGuardThreshold is the threshold to be compared with the signal from the guard sensor for rejecting false touches caused by dipping the panel into the liquid, which may have a default value such as 220. If dipping is detected at 659, then no object is reported at 665.

If no dipping is detected at 659, then tap water pouring detection is performed at 660. The steps for rejecting touches from pouring tap water: calculate the amplitudes in both directions:

$$amplitude = \max_{i=0,\ldots,(numSensors-1)}(Sig_i) - \frac{\sum_{i=0}^{numSensors-1} Sig_i}{numSensors}.$$

The condition to reject false touches from pouring tap water on the panel is: if ((amplitudeX+amplitudeY)<(2·amplitudeThreshold)), then reject touch. amplitudeThreshold Hi is where a touch is detected if the average value of amplitudes in both directions exceeds this threshold if no touch was detected in the previous scan, which may have a default value such as 460, for example. amplitudeThresholdLo is where a touch is detected if an average value of amplitudes in both directions exceeds this threshold if touch was detected in the previous scan, which may have a default value such as 400, for example.
if (touch in previous scan was detected) then amplitudeThreshold=amplitudeThresholdLo else amplitudeThreshold=amplitudeThresholdHi. If tap water pouring is detected at 661, then no object is reported at 665.

If water pouring is not detected at 661, then salty water pouring detection is performed at 662. A ratio between the signal from the sensor in mutual-cap mode (guard sensor as Tx and ganged touchpad as Rx) to the signal from the guard sensor in self-cap mode can be used to distinguish a touch by a finger from pouring salty water on the panel. The salty water pouring detection algorithm works based on the ratio between the signal from the sensor in mutual-cap mode (the guard sensor as Tx and ganged touchpad as Rx) to the signal from the guard sensor in self-cap mode: if ((16·sigGuardMut)<(ratioGuardMutSelf·sigGuardSelf)) then reject touch, where: ratioGuardMutSelfHi is where a touch is detected if $$\frac{16 \cdot sigGuardMut}{sigGuardSelf}$$

exceeds this threshold if no touch was detected in the previous scan, which may have a default value such as 20, for example. ratioGuardMutSelfLo is where a touch is detected if $$\frac{16 \cdot sigGuardMut}{sigGuardSelf}$$

exceeds this threshold if touch was detected in the previous scan, which may have a default value such as 18, for example. if (touch in previous scan was detected), then ratioGuardMutSelf=ratioGuardMutSelfLo else ratioGuardMutSelf=ratioGuardMutSelfHi.
If salt water pouring is detected at 663, then no object is reported at 665. If no salt water pouring is detected at 663, then a touch event is reported at 664.

Figure 7:
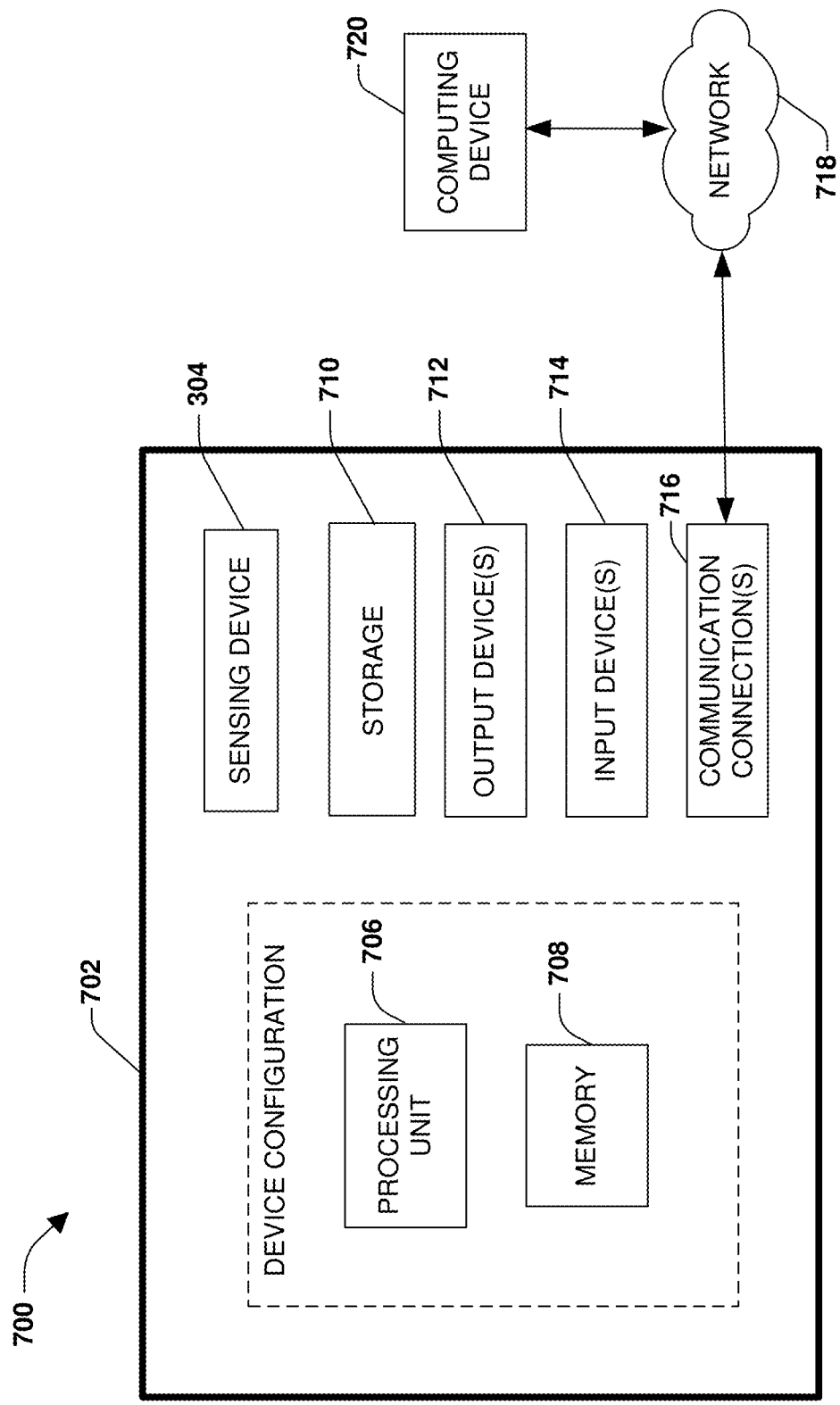
FIG. 7 illustrates an exemplary computing environment wherein one or more of the provisions set forth herein may be implemented in accordance with at least some of the techniques presented herein.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, without limitation, personal computers, server computers, hand-held or laptop devices, mobile devices (such as mobile phones, Personal Digital Assistants (PDAs), media players, and the like), kiosks, touch panel displays, printers, industrial panels, low-resolution icon-based touchscreens, multiprocessor systems, consumer electronics, smart devices (e.g., a smart speaker), mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example 700 of a system comprising a computing device 702 configured to implement one or more embodiments provided herein. In one configuration, computing device 702 includes a processing unit 706 and memory 708. Depending on the exact configuration and type of computing device, memory 708 may be volatile (such as RAM, for example), non-volatile (such as ROM, flash memory, etc., for example), or some combination of the two. This configuration is illustrated in FIG. 7 by dashed line 704.

As provided herein, the computing device 702 includes the sensing device 304 that is configured to detect unintentional touches (e.g., a liquid spill) in relation to a sensor array of the computing device 702 in order to provide liquid tolerance for the computing device 702.

In some embodiments, device 702 may include additional features and/or functionality. For example, device 702 may also include additional storage (e.g., removable and/or non-removable) including, without limitation, magnetic storage, optical storage, and the like. Such additional storage is illustrated in FIG. 7 by storage 710. In one embodiment, computer readable instructions to implement one or more embodiments provided herein may be in storage 710. Storage 710 may also store computer readable instructions to implement an operating system, an application program, and the like. Computer readable instructions may be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, without limitation, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media may be part of device 702.

Device 702 may also include communication connection(s) 716 that allows device 702 to communicate with other devices. Communication connection(s) 716 may include, without limitation, a modem, a Network Interface Card (NIC), an integrated network interface, a radio frequency transmitter/receiver, an infrared port, a USB connection, or other interfaces for connecting device 702 to other computing devices. Communication connection(s) 716 may include a wired connection or a wireless connection. Communication connection(s) 716 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 702 may include input device(s) 714 such as keyboard, mouse, pen, voice input device, touch input device, infrared cameras, video input devices, and/or any other input device. Output device(s) 712 such as one or more displays, speakers, printers, and/or any other output device may also be included in device 702. Input device(s) 714 and output device(s) 712 may be connected to device 702 via a wired connection, wireless connection, or any combination thereof. In one embodiment, an input device or an output device from another computing device may be used as input device(s) 714 or output device(s) 712 for computing device 702.

Components of device 702 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In an embodiment, components of device 702 may be interconnected by a network. For example, memory 708 may be comprised of multiple physical memory units located in different physical locations interconnected by a network.

Those skilled in the art will realize that storage devices utilized to store computer readable instructions may be distributed across a network. For example, a computing device 720 accessible via network 718 may store computer readable instructions to implement one or more embodiments provided herein. Computing device 702 may access the computing device 720 and download a part or all of the computer readable instructions for execution. Alternatively, computing device 702 may download pieces of the computer readable instructions, as needed, or some instructions may be executed at computing device 702 and some at computing device 720.

Figure 8:
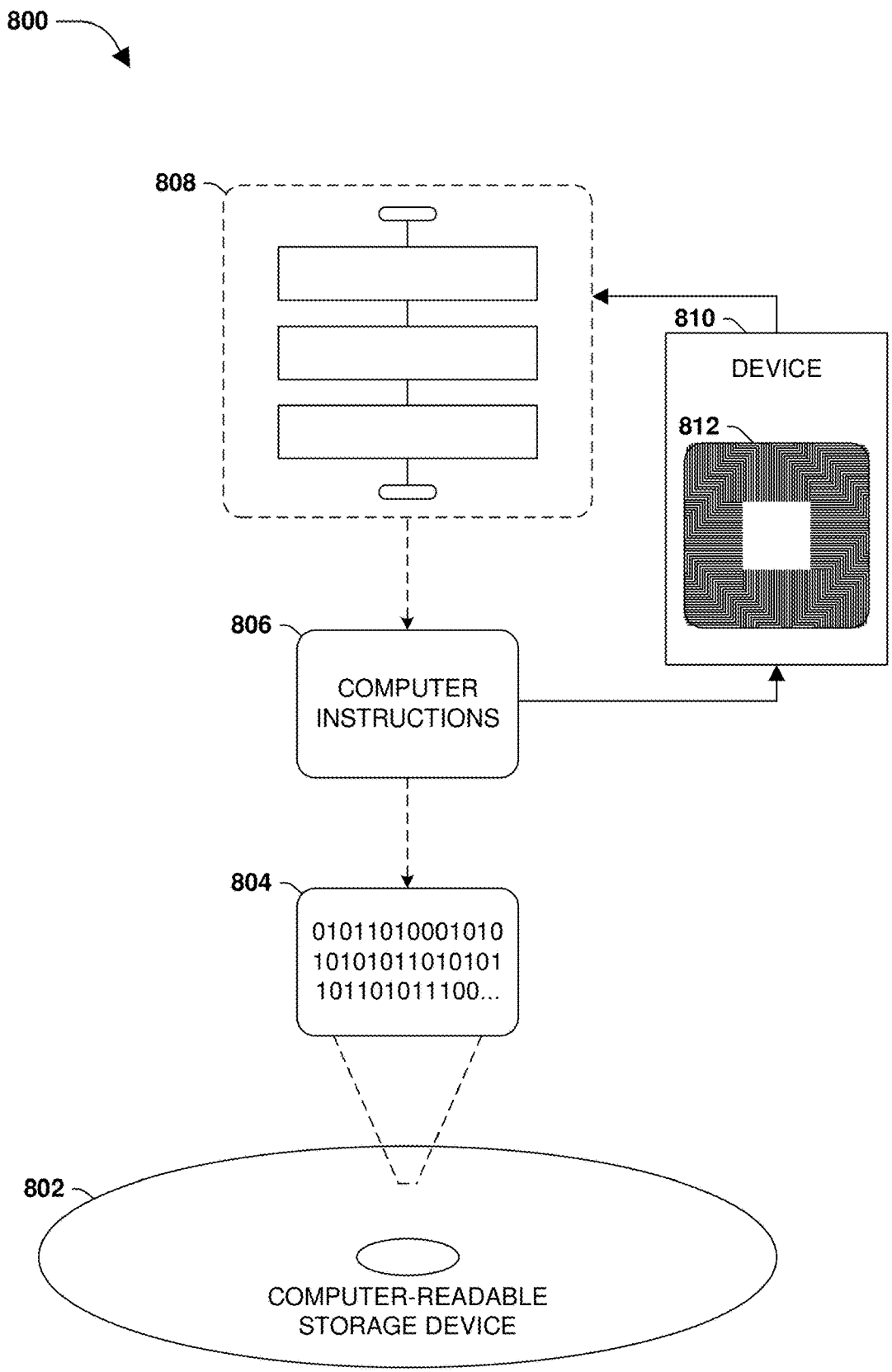
FIG. 8 is an illustration of an exemplary computer readable medium wherein processor-executable instructions configured to embody one or more of the provisions set forth herein may be comprised in accordance with at least some of the techniques presented herein.

An example computer-readable medium that may be devised in these ways is illustrated in FIG. 8, wherein the implementation 800 comprises a computer-readable memory device 802 (e.g., a CD-R, DVD-R, or a platter of a hard disk drive), on which is encoded computer-readable data 804. This computer-readable data 804 in turn comprises a set of computer instructions 806 that, when executed on a processor 812 of a device 810, provide an embodiment that causes the device 810 to operate according to the techniques presented forth herein. In some embodiments, the device 810 may correspond to a sensing device, a sensor array, a touch panel, a printer, a kiosk, etc. Many such computer-readable media may be devised by those of ordinary skill in the art that are configured to operate in accordance with the techniques presented herein. In some embodiments, the processor-executable computer instructions 806 are configured to perform a method 808, such as at least some of the exemplary method 200 of FIG. 2 and/or at least some of the exemplary method 400 of FIG. 4, for example. In some embodiments, the processor-executable computer instructions 804 are configured to implement a system, such as at least some of the exemplary device 100 of FIGS. 1A and 1B, at least some of the exemplary apparatus 302 of FIG. 3A, and/or at least some of the exemplary apparatus 502 of FIG. 5, for example. Many such computer-readable media are contemplated to operate in accordance with the techniques presented herein.

An embodiment of the presently disclosed techniques includes a method for providing liquid tolerance for a touch device. The method includes scanning a sensor array of the touch device to generate response signals. The method includes in response to a response signal of the response signals exceeding a touch threshold, performing a signal profile analysis. The method includes sorting the response signals according to ascending order of delta positions to generate sorted signals. The method includes forming an extended vector of the sorted signals. The method includes analyzing the extended vector of the sorted signals using a fitted curve. The method includes in response to a feature of the fitted curve satisfying a criteria, reporting the response signal as a touch event. The method includes in response to the feature not satisfying the criteria, rejecting the response signal as a false touch.

According to some embodiments, the method includes scanning the sensor array in a self-cap mode.

According to some embodiments, the signal profile analysis is performed to reject false touches from liquid pouring on the sensor array, and the method includes utilizing a guard electrode of the sensor array to reject false touches from liquid droplets touching the sensor array.

According to some embodiments, analyzing the extended vector includes performing a Gaussian function to calculate a Gaussian curve in real-time during operation of the touch device to generate the fitted curve.

According to some embodiments, the method includes identifying a maximum amplitude as the feature; and comparing the maximum amplitude to an amplitude threshold as the criteria to determine whether the maximum amplitude exceeds the amplitude threshold.

According to some embodiments, the method includes identifying a width of the fitted curve as the feature; and comparing the width to a width threshold as the criteria to determine whether the width exceeds the width threshold.

According to some embodiments, the method includes identifying a correlation coefficient as the feature; and utilizing the correlation coefficient to determine whether the criteria is satisfied According to some embodiments, the method includes utilizing a maximum amplitude and a width as features of the fitted curve for determining whether the criteria is satisfied.

According to some embodiments, the method includes utilizing a maximum amplitude, a width, and a correlation coefficient as features of the fitted curve for determining whether the criteria is satisfied.

An embodiment of the presently disclosed techniques includes an apparatus. The apparatus includes a sensor array of capacitive sensors connected to a sensing device that scans the sensor array to generate response signals. The apparatus includes the sensing device configured to perform a signal profile analysis in response to a response signal of the response signals exceeding a touch threshold. The sensing device performs the signal profile analysis by sorting the response signals according to ascending order of delta positions to generate sorted signals; forming an extended vector of the sorted signals; analyzing the extended vector of the sorted signals using a fitted curve; identifying an amplitude of the fitted curve; in response to the amplitude satisfying an amplitude threshold, reporting the response signal as a touch event; and in response to the amplitude not satisfying the amplitude threshold, rejecting the response signal as a false touch.

According to some embodiments, the sensor array comprises a guard electrode utilized to reject false touches from liquid droplets touching the sensor array.

According to some embodiments, the sensing device performs a Gaussian function to calculate a Gaussian curve in real-time during operation of the apparatus to generate the fitted curve.

According to some embodiments, the sensing device identifies the amplitude based upon a difference between a maximum signal measurement and an average signal measurement.

An embodiment of the presently disclosed techniques includes an apparatus. The apparatus includes a sensor array of capacitive sensors connected to a sensing device, wherein the sensor array includes a touchpad and a guard sensor. The apparatus includes the sensing device configured to scan the sensor array to determine whether a false touch has occurred by scanning a sensor of the touchpad as a first scan result while the sensor is in a mutual-cap mode, wherein the touchpad is electrically coupled together as a first pin type during the scanning of the sensor; scanning the guard sensor of the sensor array as a second scan result while the guard sensor is in a self-cap mode, wherein the guard sensor is scanned as a second pin type different than the first pin type; and comparing the first scan result and the second scan result to a threshold to determine whether the false touch or a touch event occurred.

According to some embodiments, the sensing device is configured to scan the touchpad to generate a scan result while the touchpad is in the self-cap mode, wherein inactive sensors are connected to a shield; and utilize the scan result for water pouring detection for the touchpad.

According to some embodiments, the sensing device is configured to scan the guard sensor to generate a scan result while the guard sensor is in the self-cap mode, wherein inactive sensors are connected to a shield; and utilize the scan result for liquid pour detection for the touchpad.

According to some embodiments, the sensing device is configured to scan the guard sensor to generate a scan result while the guard sensor is in the self-cap mode, wherein inactive sensors are connected to a shield; and utilize the scan result for liquid drip detection for the touchpad.

According to some embodiments, the sensing device is configured to compare a ratio of the first scan result to the second scan result to the threshold.

According to some embodiments, the first pin type is a transmitter pin type and the second pin type is a receiver pin type.

According to some embodiments, the first pin type is a receiver pin type and the second pin type is a transmitter pin type.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application can generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application

What is claimed is:

1. A method for providing liquid tolerance for a touch device, comprising:
   scanning a sensor array of the touch device to generate response signals; and
   in response to a response signal of the response signals exceeding a touch threshold, performing a signal profile analysis comprising:
      sorting the response signals according to ascending order of delta positions to generate sorted signals;
      forming an extended vector of the sorted signals;
      analyzing the extended vector of the sorted signals using a fitted curve;
      in response to a feature of the fitted curve satisfying a criteria, reporting the response signal as a touch event; and
      in response to the feature not satisfying the criteria, rejecting the response signal as a false touch.

2. The method of claim 1, wherein scanning the sensor array comprises:
   scanning the sensor array in a self-cap mode.

3. The method of claim 1, comprising:
   utilizing a guard electrode of the sensor array to reject false touches from liquid droplets touching the sensor array.

4. The method of claim 1, wherein analyzing the extended vector comprises:
performing a Gaussian function to calculate a Gaussian curve in real-time during operation of the touch device to generate the fitted curve.

5. The method of claim 1, comprising:
identifying a maximum amplitude as the feature; and
comparing the maximum amplitude to an amplitude threshold as the criteria to determine whether the maximum amplitude exceeds the amplitude threshold.

6. The method of claim 1, comprising:
identifying a width of the fitted curve as the feature; and
comparing the width to a width threshold as the criteria to determine whether the width exceeds the width threshold.

7. The method of claim 1, comprising:
identifying a correlation coefficient as the feature; and
utilizing the correlation coefficient to determine whether the criteria is satisfied.

8. The method of claim 1, comprising:
utilizing a maximum amplitude and a width as features of the fitted curve for determining whether the criteria is satisfied.

9. The method of claim 1, comprising:
utilizing a maximum amplitude, a width, and a correlation coefficient as features of the fitted curve for determining whether the criteria is satisfied.

10. An apparatus, comprising:
a sensor array of capacitive sensors connected to a sensing device that scans the sensor array to generate response signals; and
the sensing device configured to perform a signal profile analysis in response to a response signal of the response signals exceeding a touch threshold by:
sorting the response signals according to ascending order of delta positions to generate sorted signals;
forming an extended vector of the sorted signals;
analyzing the extended vector of the sorted signals using a fitted curve;
identifying an amplitude of the fitted curve;
in response to the amplitude satisfying an amplitude threshold, reporting the response signal as a touch event; and
in response to the amplitude not satisfying the amplitude threshold, rejecting the response signal as a false touch.

11. The apparatus of claim 10, wherein the sensor array comprises a guard electrode utilized to reject false touches from liquid droplets touching the sensor array.

12. The apparatus of claim 10, wherein the sensing device performs a Gaussian function to calculate a Gaussian curve in real-time during operation of the apparatus to generate the fitted curve.

13. The apparatus of claim 10, wherein the sensing device identifies the amplitude based upon a difference between a maximum signal measurement and an average signal measurement.

14. A sensing controller comprising:
an input pin coupled to at least one capacitive sensor, the input pin for receiving a plurality of response signals representative of a physical characteristic of the capacitive sensor;
a sensing circuit configured to perform a signal profile analysis in response to a response signal of the response signals exceeding a touch threshold by:
sorting the response signals according to ascending order of delta positions to generate sorted signals;
forming an extended vector of the sorted signals;
analyzing the extended vector of the sorted signals using a fitted curve;
identifying an amplitude of the fitted curve;
in response to the amplitude satisfying an amplitude threshold, reporting the response signal as a touch event; and
in response to the amplitude not satisfying the amplitude threshold, rejecting the response signal as a false touch.

15. The sensing controller of claim 14 wherein the sensing device performs a Gaussian function to calculate a Gaussian curve in real-time during operation of the apparatus to generate the fitted curve.

16. The sensing controller of claim 14, wherein the sensing device identifies the amplitude based upon a difference between a maximum signal measurement and an average signal measurement.

17. The sensing device of claim 14, wherein the sensing device:
identifies a correlation coefficient as the feature; and
utilizes the correlation coefficient to determine whether the criteria is satisfied.

18. The sensing device of claim 14, wherein the sensing device utilizes a maximum amplitude and a width as features of the fitted curve for determining whether the criteria is satisfied.

19. The sensing device of claim 14, wherein the sensing device utilizes a maximum amplitude, a width, and a correlation coefficient as features of the fitted curve for determining whether the criteria is satisfied.

* * * * *